(12) United States Patent
Ramaiah et al.

(10) Patent No.: US 7,751,311 B2
(45) Date of Patent: Jul. 6, 2010

(54) HIGH AVAILABILITY TRANSPORT PROTOCOL METHOD AND APPARATUS

(75) Inventors: Anantha Ramaiah, Sunnyvale, CA (US); Chandrashekhar Appanna, Cupertino, CA (US); Amol Khare, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1080 days.

(21) Appl. No.: 11/134,678

(22) Filed: May 19, 2005

(65) Prior Publication Data

US 2006/0262716 A1 Nov. 23, 2006

(51) Int. Cl.
  *G01R 31/08* (2006.01)
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)

(52) U.S. Cl. ............... 370/218; 370/244; 370/389; 370/401

(58) Field of Classification Search ............ 370/216
See application file for complete search history.

(56) References Cited

U.S. PATENT DOCUMENTS

| | | | |
|---|---|---|---|
| 6,601,101 B1* | 7/2003 | Lee et al. | 709/227 |
| 6,934,875 B2 | 8/2005 | Kashyap | |
| 6,944,673 B2* | 9/2005 | Malan et al. | 709/237 |
| 6,958,997 B1* | 10/2005 | Bolton | 370/392 |
| 7,003,692 B1* | 2/2006 | Banks et al. | 714/12 |
| 7,085,960 B2* | 8/2006 | Bouat et al. | 714/13 |
| 2004/0049774 A1* | 3/2004 | Boyd et al. | 719/312 |
| 2004/0268175 A1 | 12/2004 | Koch et al. | |
| 2005/0086342 A1 | 4/2005 | Burt et al. | |
| 2005/0265346 A1* | 12/2005 | Ho et al. | 370/392 |

OTHER PUBLICATIONS

Information Sciences Institute, "Transmission Control Protocol, DARPA Internet Program, Protocol Specification", dated Sep. 1981, prepared for Defense Advanced Research Projects Agency, 180 pgs.
Y. Rekhter, et al., "A Border Gateway Protocol 4 (BGP-4)", Memo, Network Working Group Request for Comments: 1771, dated Mar. 1995, 58 pgs.

* cited by examiner

*Primary Examiner*—Daniel J Ryman
*Assistant Examiner*—Nishant B Divecha
(74) *Attorney, Agent, or Firm*—Hickman Palermo Truong & Becker LLP

(57) ABSTRACT

A system and method supporting efficient, scalable stateful switchover of transport layer connections in a telecommunications network element. One method involves receiving, at a network element comprising an active transport protocol process coupled to a standby protocol process, a request to configure a first transport layer connection maintained at the active transport protocol process for stateful switchover; receiving an event associated with the first transport layer connection; creating a message containing replicated event information based on the received event; sending the message to the standby transport protocol process; and processing the message at the standby transport protocol process, wherein the standby transport protocol process replicates state information for the first connection.

19 Claims, 8 Drawing Sheets

HIGH AVAILABILITY TRANSPORT PROTOCOL METHOD AND APPARATUS

CROSS-REFERENCE TO RELATED APPLICATIONS

This application is related to co-pending, commonly assigned application Ser. No. 10/808,040, filed Mar. 24, 2004, entitled "Routing system and method for transparently recovering routing states after a failover or during a software upgrade," of Chandrashekhar Appanna et al., and to co-pending, commonly assigned application Ser. No. 10/948,732, filed Sep. 22, 2004, entitled "Cooperative TCP/BGP Window Management For Stateful Switchover," of Chandrashekhar Appanna et al.

FIELD OF THE INVENTION

The present invention generally relates to providing high availability or fault-tolerant transport layer connections in telecommunication networks. The invention relates more specifically to approaches for supporting reliable and efficient switchover of Transport Connection Protocol (TCP) connections in routers and switches without interfering with network routing and switching operations.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in *RFC*1771 (published by the Internet Engineering Task Force (IETF) in March 1995).

To exchange routing information, two BGP hosts first establish a peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path. In a BGP host, the routes are stored in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As networks grow more complex and the number of BGP routes maintained by a particular element increases, the consequences of the failure of a BGP host device, or the BGP process that it hosts, become more severe. For example, in some scenarios a BGP failure may require retransmission of a large amount of route information and re-computation of a large amount of network reachability information. Therefore, vendors of network gear and their customers wish to deploy BGP in a fault-tolerant manner.

BGP commonly runs on and uses the Transmission Control Protocol (TCP) as defined in RFC 793, which provides a connection-oriented, reliable data delivery service for applications such as BGP. Having highly available, reliable TCP connections that can be switched over in the face of failure is a foundation requirement for providing BGP with high availability.

Highly reliable networks offer high availability by detecting failures and handling the failures in a timely manner with zero or minimal disruption of service. Redundant systems that have at least one secondary processor are often used to achieve high reliability. When the secondary processor is synchronized to the primary processor, and can take over with almost no visible interruption to peer devices, the secondary processor is termed a "hot standby" and the switchover is termed "stateful switchover" or SSO.

SSO can be implemented in a telecommunication network with network elements that have dual route processors, each of which can host separate but duplicate instances of various software applications. One route processor is deemed Active and the other is deemed Standby. When the processors are operating in SSO mode, the active route processor automatically replicates all messages that it receives or sends, for all protocols or activities, and sends the replicated messages to the standby route processor.

In some embodiments, the active route processor periodically sends a bulk copy of data representing a particular state (a "checkpoint") to the standby route processor. While replication and checkpointing enable the standby route processor to achieve synchronization of state with the active route processor, these approaches require considerable use of processing resources and memory, and require extensive use of an inter-processor communication mechanism. When a route processor is managing a large number of BGP sessions and TCP connections, the burden of continually operating in SSO mode may become unacceptable.

As networks grow larger and more complex, network reliability and throughput depends to a greater extent upon the availability of software processes that implement BGP. For example, when a BGP host becomes unavailable, many other BGP peers may need to re-compute route information to account for the unavailability. Other hosts may lose BGP connectivity during the transition. Thus, present approaches for upgrading BGP software to support new features in large networks cause significant network churn. Network administrators are demanding a better solution that does not perturb the network.

Moreover, BGP is merely one example of an application for which high availability is desirable; there are many other applications. BGP and other applications running on top of transport-layer protocols, such as TCP, would benefit greatly from a solution providing true SSO for the TCP connections, achieved in a scalable manner.

Further, users and administrators expect any SSO support for TCP to provide a solution that performs well and scales to large networks that use existing and future platforms without major hardware upgrades.

One approach for providing high-availability TCP involves massive data checkpointing of send and receive windows and related metadata for all established TCP connections. While this approach does allow active and standby processors to maintain identical TCP state information, it is a "brute-force" approach that requires extensive CPU resources. Network administrators desire to have a more efficient approach that is readily scalable to large numbers of connections.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
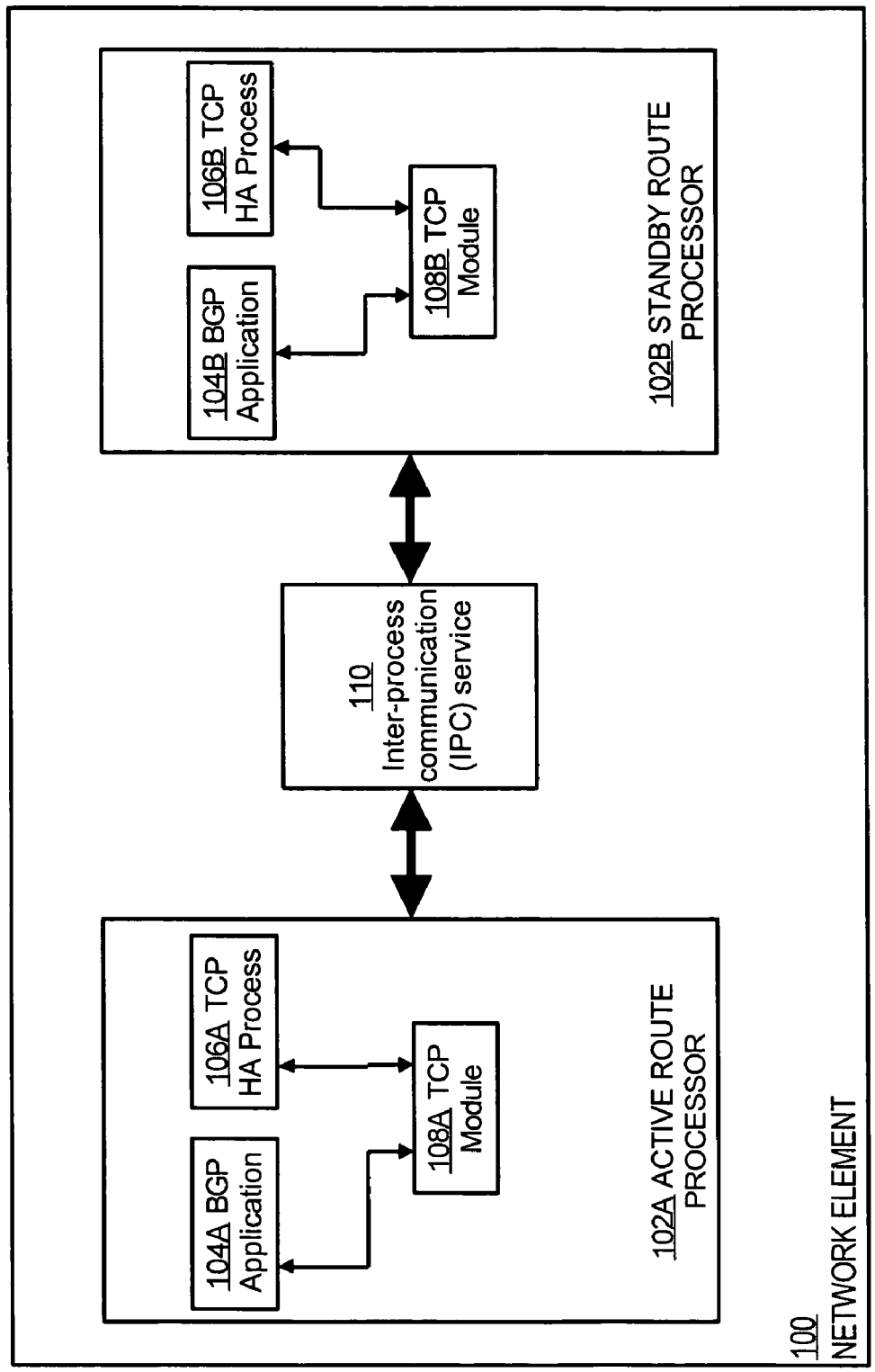
FIG. 1A is a block diagram that illustrates an overview of a network element that may be used to implement an embodiment.

A high availability transport protocol method and apparatus are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Example Implementation of High Availability Transport Protocol Method and Apparatus
   3.1 State Replication
   3.2 Setting Up And Synchronizing New Connections
   3.3 Processing Send Window Values
   3.4 Initial Synchronization Of Standby Tcp Module
   3.5 State Tracking And Verification
   3.6 Post-Switchover Processing
   3.7 Benefits Of Certain Embodiments
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method comprising receiving, at a network element comprising an active transport protocol process coupled to a standby protocol process, a request to configure a first transport layer connection maintained at the active transport protocol process for stateful switchover; receiving an event associated with the first transport layer connection; creating a message containing replicated event information based on the received event; sending the message to the standby transport protocol process; and processing the message at the standby transport protocol process, and the standby transport protocol process replicates state information for the first connection.

According to one feature, the active transport protocol process and the standby transport protocol processes implement transmission control protocol (TCP). In another feature, the message is sent from the active transport protocol process to the standby transport protocol process using a peer signaling layer, and the message is not communicated to one or more logically lower protocol layers.

In another feature, the event comprises a TCP SYN segment; the active transport protocol process completes establishment of the first connection without informing the standby transport protocol process, creates a copy of a TCP control block, places the TCP control block copy in the event message; and the standby transport protocol process creates a second connection that replicates the first transport layer connection and uses the TCP control block copy.

In yet another feature, the active transport protocol process further performs one or more security checks on the TCP SYN segment, and the active transport protocol process sends the event message only if the TCP SYN segment passes the one or more security checks. In still another feature, the first transport protocol connection is configured not to perform send window checkpointing, and the active transport protocol process creates and sends, to the standby transport protocol process, a TCP segment with a valid header, correct length, and dummy data.

In still another feature, the method further comprises receiving a request for state verification, testing whether one or more state values maintained by the active transport protocol process for the first transport protocol connection match one or more corresponding state values that are maintained by the standby transport protocol process for a replica of the first transport protocol connection, and performing a responsive action when no match occurs.

In another feature, in response to a switchover, the standby transport protocol process processes all pending events associated with all active connections, resets all timer values associated with the connections, and resets all option values associated with the connections before becoming active.

In other aspects, the invention encompasses a computer apparatus and a computer-readable medium configured to carry out the foregoing steps.

2.0 Structural and Functional Overview

FIG. 1A is a block diagram that illustrates an overview of a network element that may be used to implement an embodiment. A network element 100 comprises an active route processor 102A and a standby route processor 102B arranged in a redundant or fault-tolerant configuration. In one embodiment, network element 100 is a dual-processor router or switch that participates in a packet-switched network or internetwork. Active route processor 102A hosts a TCP module 108A that runs or controls a TCP high-availability (HA) process 106A and a BGP application 104A. Standby route processor 102B hosts a TCP module 108B, BGP application 104B, and TCP HA process 106B.

TCP modules 108A, 108B and TCP HA processes 106A, 106B provide transport control protocol functionality. BGP application 104A, 104B provide border gateway protocol functionality. In alternative embodiments, active route processor 102A and standby route processor 102B may host other protocols and applications. Thus, TCP modules 108A, 108B, TCP HA processes 106A, 106B, and BGP application 104A, 104B are shown only as examples and not as requirements.

An inter-process communication (IPC) service 110 is coupled between active route processor 102A and standby route processor 102B, and provides a means for the route processors to exchange data and instructions.

In one embodiment, network element 100 is implemented as one of the Cisco 10000 Series Routers, commercially available from Cisco Systems, Inc. Alternatively, network element could be a Cisco CRS-1 Carrier Routing System. The arrangement of FIG. 1A represents just one possible context for applying the approaches described herein.

The approaches herein provide an architecture comprising multiple techniques to achieve SSO for TCP connections that will perform and scale well on current and future router platforms without requiring special hardware assistance. Generally, the adaptive TCP SSO architecture proposed herein implements a high availability TCP module that will extract the events necessary for providing SSO functionality for TCP connections based on system behavior and then signal the events to a standby TCP module. The standby TCP module uses the events to recreate state data that is identical in form and function to the state data at the active TCP module. Applications that use or run on TCP connections also participate in certain respects. With this approach, a scalable, efficient and useful TCP SSO support implementation is made possible by providing an architecture that can adapt to the needs of TCP applications, and can be tuned based on application needs and strengths.

Figure 1B:
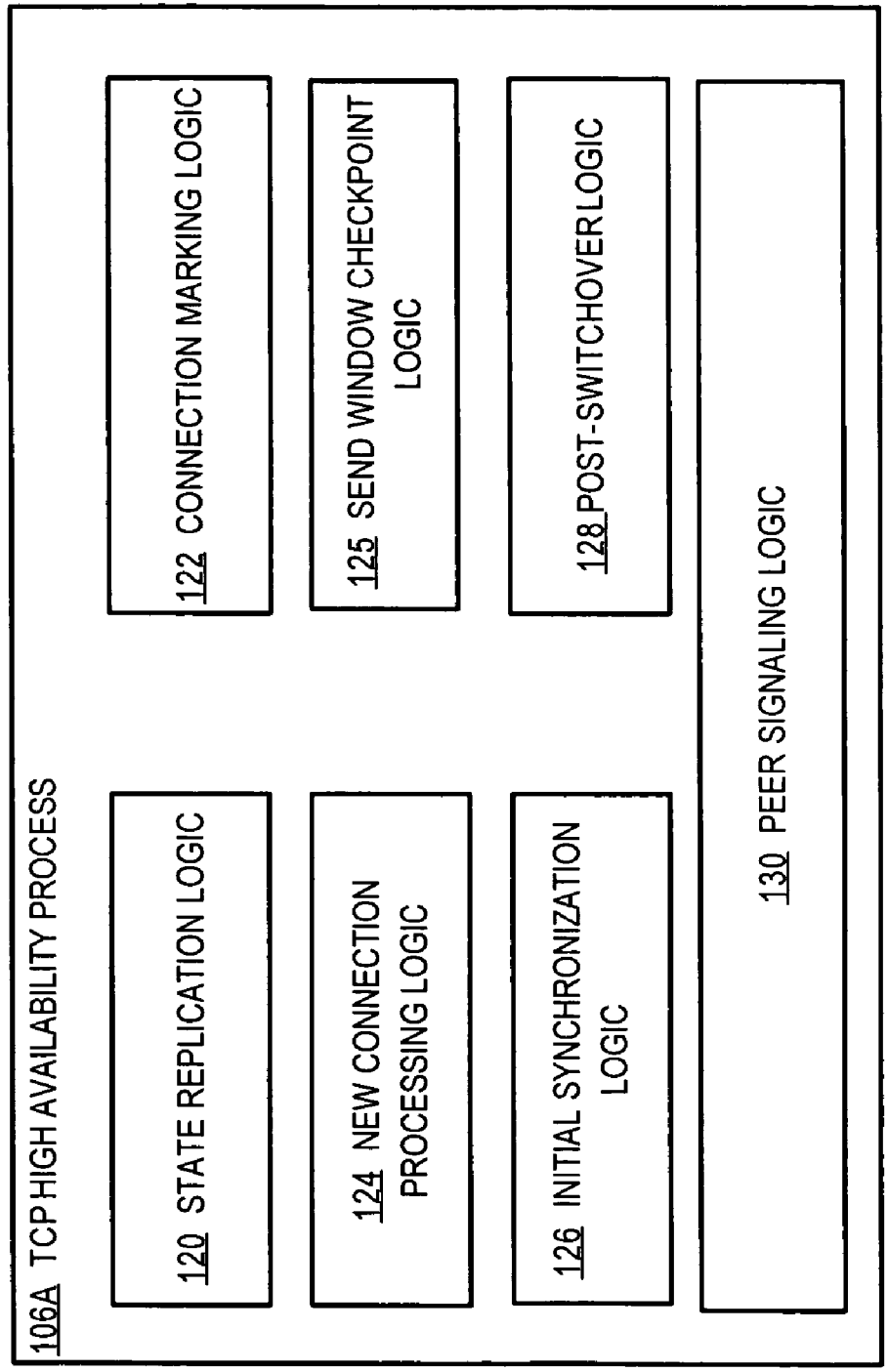
FIG. 1B is a block diagram showing example functional elements in a TCP high availability process.

FIG. 1B is a block diagram showing example functional elements in a TCP high availability process, such as TCP high availability process 106A of FIG. 1A. In one embodiment, TCP high availability process 106A comprises state replication logic 120, connection marking logic 122, new connection processing logic 124, send window checkpoint logic 125, initial synchronization logic 126, post-switchover logic 128, and peer signaling logic 130. The foregoing elements may be implemented as one or more sequences of computer program instructions, or other software elements, for implementing the functions described herein. Specific logical functions are described in succeeding sections.

Figure 2A:
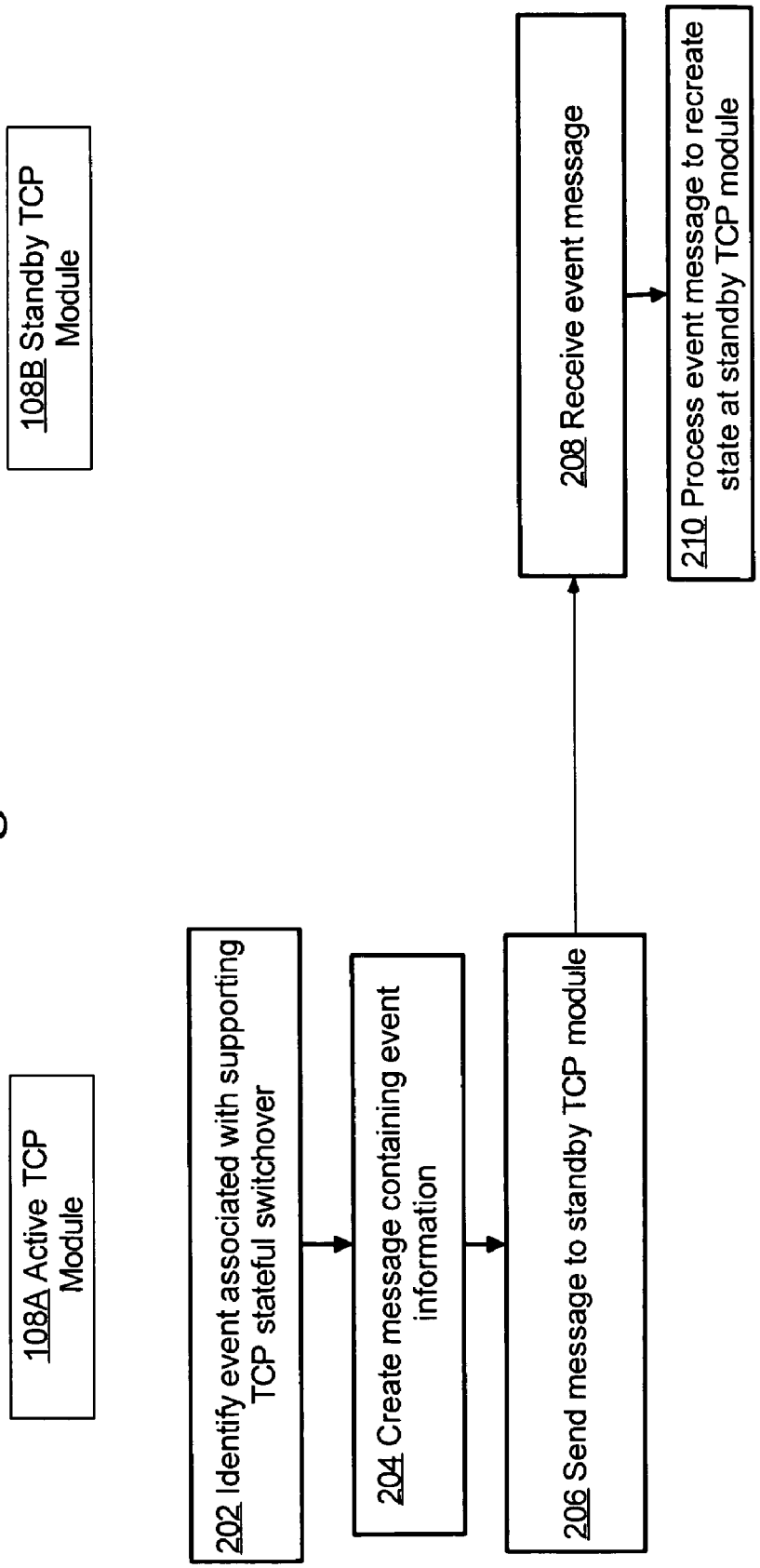
FIG. 2A is a flow diagram that illustrates a high level overview of one embodiment of a method for providing high-availability transport layer connections.
Figure 2B:
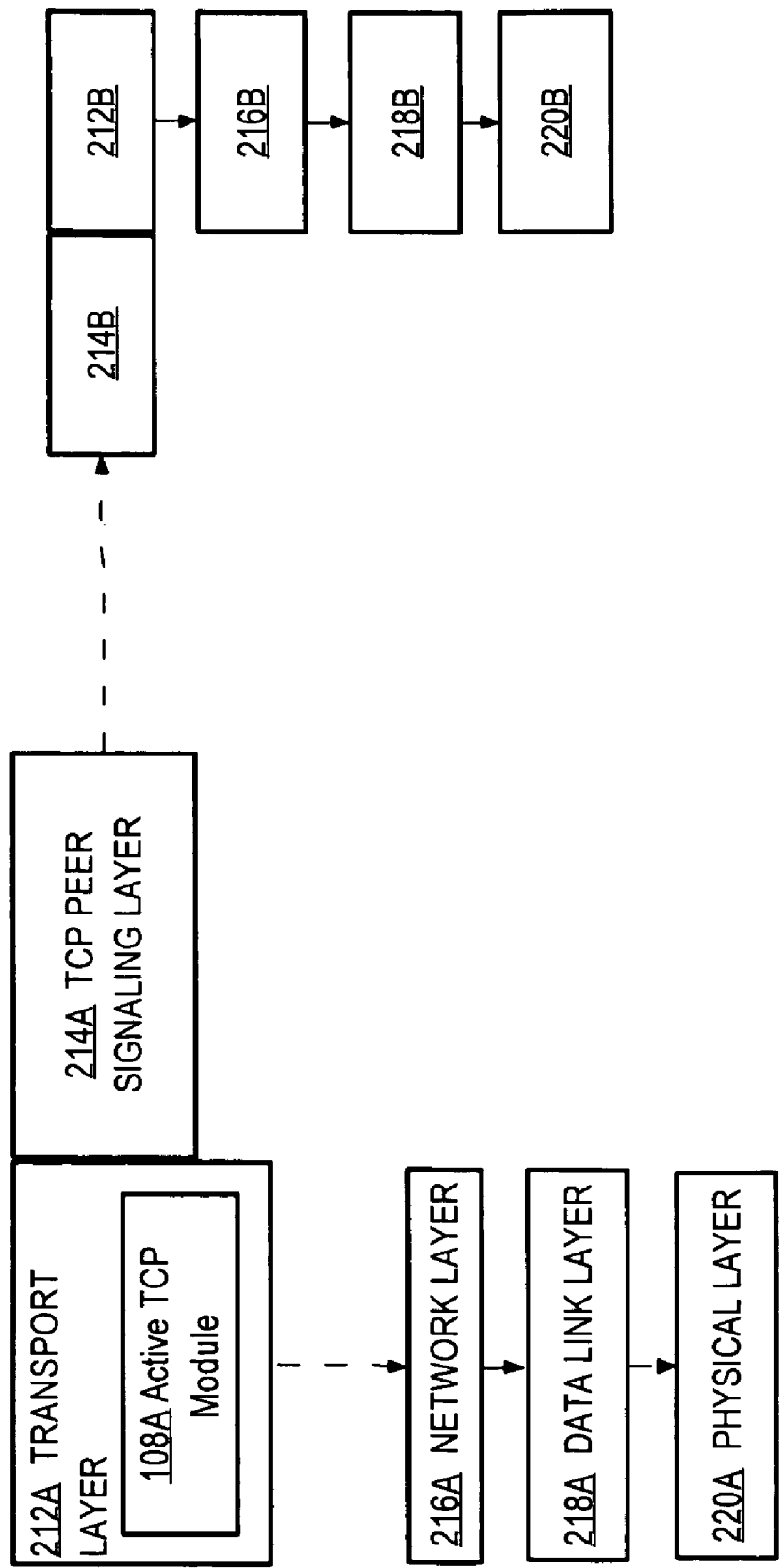
FIG. 2B is a block diagram showing the use of a peer signaling layer for communicating events among active and standby TCP layers.

FIG. 2A is a flow diagram that illustrates a high level overview of one embodiment of a method for providing high-availability transport layer connections. FIG. 2B is a block diagram showing the use of a peer signaling layer for communicating events among active and standby TCP layers. Referring first to FIG. 2A, in one embodiment the active TCP module 108a of FIG. 1A first identifies an event associated with supporting TCP stateful switchover. Events may include receiving certain kinds of TCP segments, receiving information relating to application behavior or system behavior, etc.

At step 204, the active TCP module creates a message containing event information. The message created at step 204 comprises, for example, information that the standby TCP module needs to replicate state information that is equivalent to state maintained at the active TCP module.

At step 206, the message created at step 204 is sent to the standby TCP module. At the standby TCP module 108B, the event message is received at step 208. The standby TCP module 108B then processes the event message to recreate state information at the standby TCP module. The recreated state information is equivalent to state information maintained by the active TCP module. However, the approach of FIG. 2A does not require checkpointing all data that is actually carried in TCP segments that are received at the active TCP module 108A as part of an established TCP connection. Therefore, the present approach achieves far greater efficiency and scalability than past approaches.

In one embodiment, messages created at step 204 are sent at step 206 from one transport layer module hosted by an active route processor directly to a transport layer module hosted by a standby route processor, without passing down other stack layers. Referring now to FIG. 2B, when an implementation is structured according to the seven-layer Open Systems Interconnect (OSI) model of network software, the active TCP module 108A of FIG. 1 may reside conceptually at the transport layer 212A and a TCP peer signaling layer 214A may be coupled to the transport layer. The TCP peer signaling layer 214A establishes a messaging connection directly to a counterpart peer signaling layer 214B associated with a transport layer 212B of a standby processor. The active TCP module 108A can send messages directly to a standby TCP module 108B through the TCP peer signaling layers 214A, 214B without traversing lower layers such as network layer 216A (which may implement IP), data link layer 218A, or physical layer 220A.

In the approach of FIG. 2A, TCP connection data as received "on the wire" at the active TCP module 108A serves as a primary driver for generating state information in a TCP state machine for a connection on the standby TCP module 108B. In an embodiment, all connection data is replicated at the active TCP module 108A, sent to the standby TCP module 108B, and processed by the TCP state machine of the standby TCP module as if the data came from the wire directly to the standby TCP module. This approach exploits the observation that two TCP stacks that are RFC compliant must produce the same end state given the same packet inputs. The peer-to-peer signaling mechanism transfers packets or events into the TCP state machine on the standby TCP module without involving lower layers.

Further, in one embodiment, higher-layer TCP applications hosted at the standby route processor can read packets as if the packets are arriving on the connection from the wire. Each TCP connection represented on the standby TCP module is maintained in a read-only mode, i.e., applications cannot write packets into the connection or send TCP segments using the connection.

While certain embodiments are described herein in the context of TCP, the broad approaches herein apply to other transport layer protocols, such as Stream Control Transmission Protocol (SCTP). Certain embodiments are useful in the context of performing non-stop routing processes. Such processes are described, for example, in co-pending application Ser. No. 10/808,040, filed Mar. 24, 2004, entitled "Routing system and method for transparently recovering routing states after a failover or during a software upgrade," of Chandrashekhar Appanna et al.

The approaches provided herein can support failover of passive open connections, which are TCP connections originating from another BGP peer. The approaches herein also support failover of active open connections, which are TCP connections originating from a particular BGP peer that implements the approaches herein. The approaches herein can handle asymmetric startup, which occurs when a secondary processor initiates operation or is added after a primary process initializes and establishes TCP connections with a peer.

3.0 Example Implementation of High Availability Transport Protocol Method and Apparatus An example implementation of a high availability transport protocol method is now described with reference to FIG. 3, FIG. 4, and FIG. 5, which are flow diagrams that illustrate details of one embodiment of a method for providing high-availability transport layer connections.

3.1 State Replication

TCP is a stateful protocol that provides reliable datagram delivery, flow control, and congestion control for higher-order applications. To provide these services, a TCP implementation maintains state data that includes variables, such as window sizes, round trip time, etc.; a re-transmission queue containing copies of segments that have been sent but not yet acknowledged; and timers. A successful switchover to a secondary processor of TCP requires timely synchronization of such state data to the secondary processor.

Applications that run on transport layer connections may initiate the creation of replicated connection state information in the following manner. Referring to FIG. 3, at step 302, an application determines that a specified connection should have stateful switchover (SSO) treatment. At step 304, the application initiates a function call to an API exposed by a TCP high availability process, such as TCP high availability process 106A, and requests TCP to configure a particular connection for SSO. In the API call the application may provide information identifying a connection, such as a five-tuple of flow parameters. In response, the TCP high availability process configures the requested connection for SSO treatment. Such configuration may include setting a property value in a data structure that stores connection properties for a particular TCP connection, marking the connection in a table, storing flow parameters in a table having entries only for SSO connections, etc. An application may also maintain information at the application layer indicating that particular underlying connections are SSO configured.

At step 310, the active TCP module receives a TCP segment for a particular connection. At step 312, the active TCP module determines whether the particular connection is configured for SSO. Step 312 may be implemented as a filter in the packet input path, such that only packets for SSO connections are replicated reliably to the standby TCP module.

If the particular connection is not SSO configured, then normal TCP processing is performed at step 314, and the standby TCP module never becomes involved. If SSO configuration is indicated, then at step 316, a copy of the packet is created, and at step 318 a message containing the packet copy is sent to the standby TCP module. The TCP peer signaling layer 214A, 214B may be used for such messaging. Upon receiving the message, the standby TCP module processes the packet using its TCP state machine, resulting in creating equivalent state at the standby TCP module.

In an embodiment, messages sent on peer signaling layer 214A, 214B are tagged with message type values to differentiate messages containing segments received for an existing SSO connection and for a new connection. For example, the message type "TCP_HA_PKT" may designate a TCP packet or segment received for an existing SSO connection, and the message type "TCP_HA_NEW_CONN" may designate a segment associated with a new connection, for which ISN synchronization is required. Other messages to verify, clear, query, and support asymmetric startup may be defined.

Figure 3:
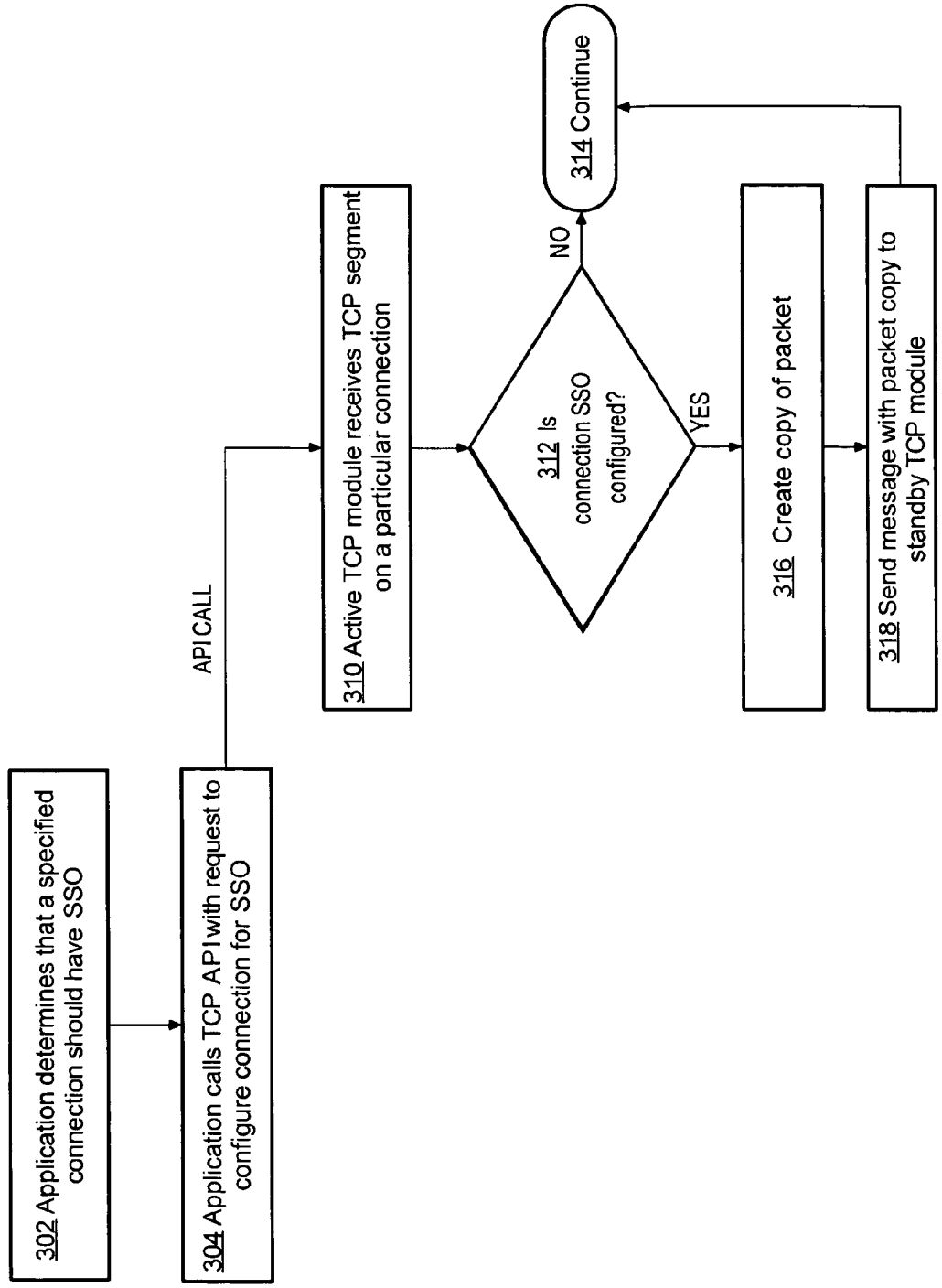
FIG. 3, FIG. 4, and FIG. 5 are flow diagrams that illustrate details of one embodiment of a method for providing high-availability transport layer connections.

Thus, in the approach of FIG. 3, an application such as BGP can specify whether a connection is highly available or not. Only for connections that are marked highly available, packets are cloned and sent to the standby TCP module. Replication and communication of the packets occurs at the transport protocol level. This approach ensures that the inbound packet runs through the standby state machine and is synchronized with the active TCP module state machine.

The approach of FIG. 3 represents an improvement over brute-force data checkpointing approaches, because TCP state changes for every processed packet, and checkpointing each and every state change may require excessive use of inter-process communication (IPC) resources. Further, with checkpointing approaches, synchronization becomes difficult for highly different or divergent versions of the TCP software. Moreover, a checkpointing approach cannot result in modifying all local variables that are maintained internally by the standby TCP module.

State replication logic 120 of FIG. 1B can implement the process of FIG. 3 as described above.

3.2 Setting Up and Synchronizing New Connections

According to one embodiment, special processing is performed to set up and synchronize the standby TCP module when the active TCP module receives segments associated with establishing one or more new TCP connections. In particular, special processing is performed to result in synchronization of TCP initial sequence number (ISN) values at both the active TCP module and standby TCP module.

To provide such synchronization, peer-peer packet replication cannot be performed without considering the contents of the packets. A TCP peer independently selects the ISN for a connection. Therefore, if the active TCP module simply sends the standby TCP module every SYN packet that is received from a peer, the active TCP module and standby TCP module will select different ISN values. In such an approach, a switchover to the standby TCP module would result in non-recoverable loss of synchronization between the standby TCP module and the peer.

Figure 4:
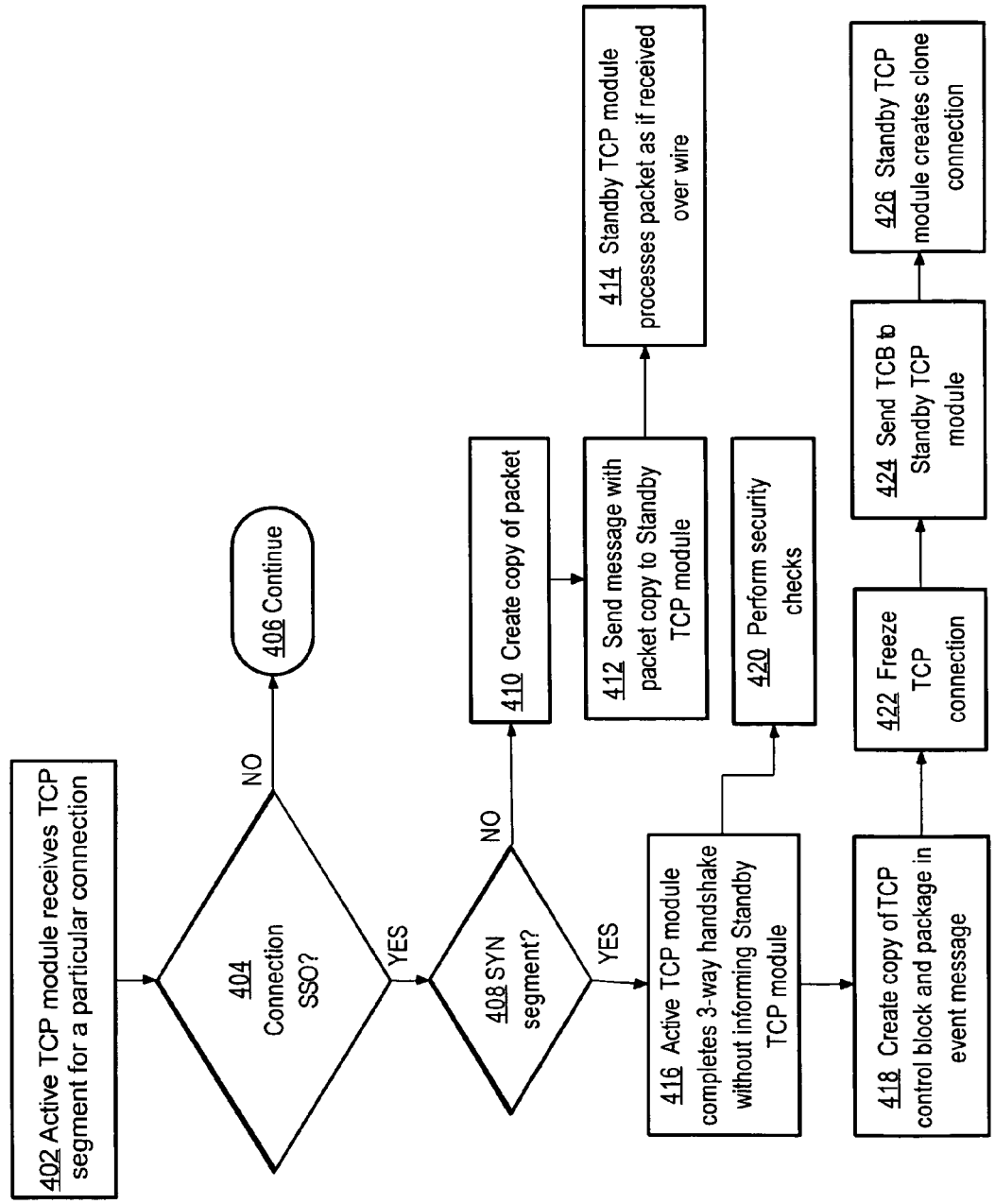

Referring now to FIG. 4, at step 402, the active TCP module receives a TCP segment for a particular connection. At step 404, the active TCP module determines whether the particular connection is configured for stateful switchover. If not, then in step 406 normal TCP processing is performed.

If the particular connection is configured for SSO, then at step 408, the active TCP module determines whether it has received a SYN segment on the particular connection. According to RFC 793, which defines TCP, a SYN segment is associated with initiating a new connection. If a SYN segment was not received, then the active TCP module performs steps 410 to step 414. At step 410, the packet containing the segment is copied. At step 412, the packet copy is encapsulated in a TCP peer-to-peer signaling message, and sent to the standby TCP module. The standby TCP module processes the packet as if it received the packet over the wire in a real connection, thereby duplicating state information held by the active TCP module.

If the active TCP module has received a SYN segment, then steps 416 to 426 are performed. At step 416, the active TCP module completes a conventional three-way handshake message exchange with the peer TCP process, without informing the standby TCP module, and without replicating packets and segments involved in the handshake or sending such packets or segments to the standby TCP module. Thus, at step 416 a new connection may reach the ESTABLISHED state defined in RFC 793 without involvement of the standby TCP module and without replication of state at the standby TCP module.

Optionally, at step 420, one or more security checks may be performed. For example, the security checks may test for the presence of SYN flood attacks. If such an attack is identified, it may be suppressed and remaining steps may be skipped without informing the standby TCP module.

At step 418, the active TCP module creates a copy of the TCP control block (TCB) that the active TCP module has created and is maintaining for the new connection resulting from completing the handshake at step 416. The TCB is packaged in an event message.

At step 422, the current TCP connection is frozen at the active TCP module. Freezing a connection may involve marking the connection as temporarily unavailable at the active TCP module. Freezing a connection prevents the TCP state machine of the active TCP module from changing state while the process of FIG. 4 is transferring the TCB for the connection to the standby TCP module, so that the TCB at the active TCP module and a copy received at the standby TCP module reflect the same state.

At step 424, the active TCP module sends the TCB copy to the standby TCP module. At step 426, the standby TCP module creates a duplicate or clone connection based on the received TCB. After performing step 426, the standby TCP module has created a connection and associated data structure equivalent to the new connection at the active TCP module. The active TCP module then can unfreeze the connection and continue processing segments associated with the connection. The techniques for state replication described above for FIG. 3 are then used to maintain equivalent state at the active TCP module and standby TCP module.

Thus, in the approach of FIG. 4, whenever a new connection is established, only the active TCP module selects an ISN value, and the active TCP module then informs the standby TCP module about the selected ISN by providing a replica of the initial TCP control block for the connection. During the transfer the TCP connection is frozen, to prevent the active TCP module from performing any further changes in state data. The standby TCP module does not generate the ISN, and after switchover, the standby TCP module uses the ISN contained in a previous message from the active TCP module for processing subsequent segments that are received from the peer.

In one embodiment, only connections that pass one or more security checks are transferred to the standby TCP module.

New connection processing logic 124 can implement the processes of FIG. 4 as described above.

3.3 Processing Send Window Values

The approach herein allows an application to specify whether TCP send window values should be periodically checkpointed to the standby TCP module. Many applications can do not require send window checkpointing. For these applications, in the approach herein, only information indicating an event, such as reception of a packet, is passed from the active TCP module to the standby TCP module.

Figure 5:
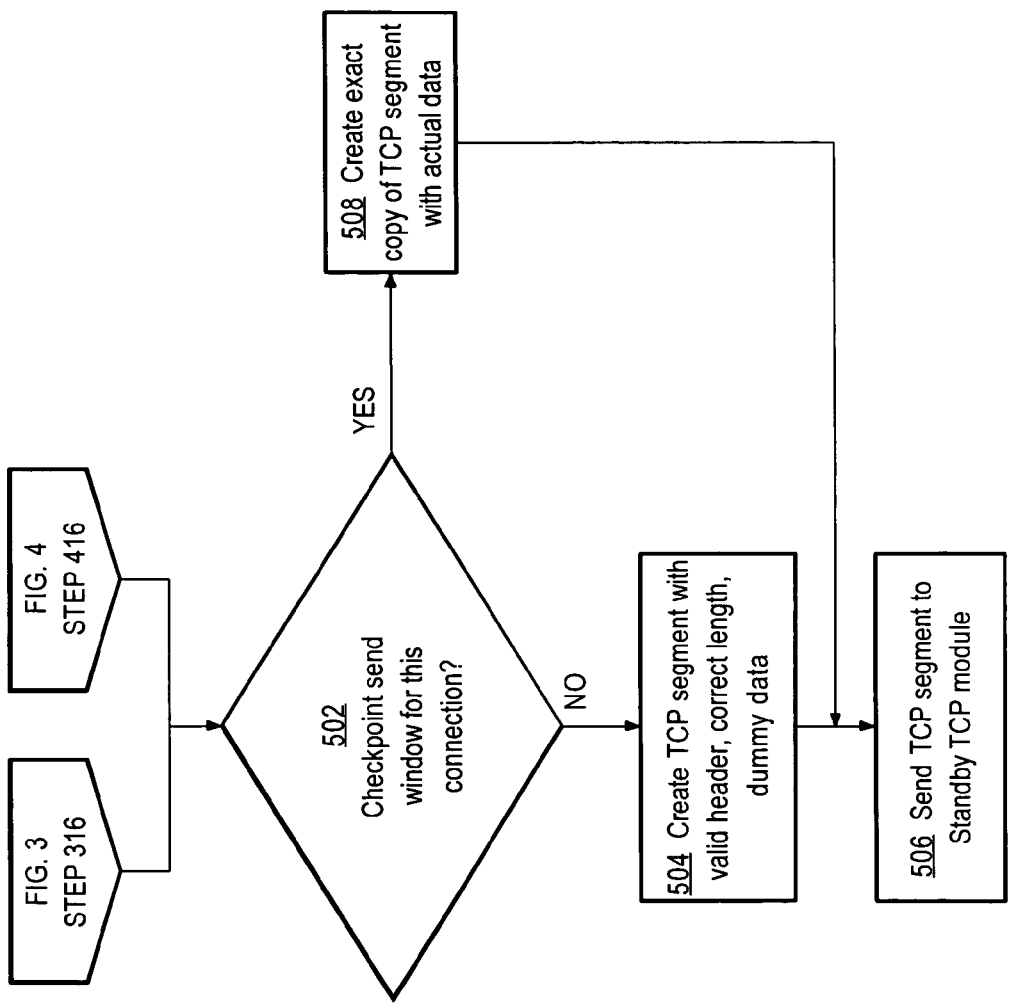

Referring now to FIG. 5, after either step 316 of FIG. 3 or step 416 of FIG. 4, a test is performed to determine whether the current connection is configured for checkpointing send window values, as shown by step 502. If so, then at step 508, the active TCP module creates an exact copy of a received TCP segment including actual data as received from the peer. At step 506, the TCP segment copy is sent to the standby TCP module. The standby TCP module passes the received segment copy through its state machine, resulting in creating equivalent send window values and state. This alternative is appropriate only if enough IPC bandwidth is available for transmitting all the data.

Alternatively, if send window checkpointing is not configured, then at step 504 the active TCP module creates a TCP segment copy having a valid, replicated header and correct segment length based on the data included in the original segment, but containing dummy data. The segment is sent to the standby TCP module at step 506.

The standby TCP module passes the received segment copy through its state machine, resulting in creating equivalent send window values and state, without data or state checkpointing. Other techniques for processing dummy data are described in co-pending application Ser. No. 10/948,732, filed Sep. 22, 2004, entitled Cooperative TCP/BGP Window Management For Stateful Switchover, of Chandrashekhar Appanna et al.

With this approach, applications can select whether to implement send window checkpointing. Thus, the system architecture and methods provided herein are adaptive to the needs of applications.

Applications are expected to be able to fill any holes in the TCP send window after a switchover if and only if there is need for a retransmission. Further, in one embodiment, the active TCP module does not fragment application protocol data units (PDUs), which ensures that send windows will synchronize after switchover. In an embodiment, multiple messages may be grouped and Nagle's algorithm may be implemented, but without fragmentation.

Send window checkpoint logic 125 of FIG. 1B can implement the functions described above.

3.4 Initial Synchronization of Standby TCP Module

In one embodiment, special processing steps are performed when a standby TCP module initiates operation. For example, the standby TCP module contacts the active TCP module using TCP peer signaling layers 214B, 214A to request and receive all state data for all SSO-enabled connections that are then currently maintained on the active TCP module. As described above, applications running on TCP specify when certain TCP connections are SSO enabled. Further, the active TCP module triggers such applications to perform follow-up processing for active connections when the standby TCP module initiates operation. For example, the active TCP module may inform a BGP application by invoking callback functions to indicate that the TCP processing involved in synchronization for a particular TCP connection or TCB is complete.

In one embodiment, initial synchronization logic 126 enables applications to group and optimize the order in which SSO is enabled on TCP connections. No particular order is required, and an asynchronous event can be used for enabling SSO.

Initial synchronization logic 126 of FIG. 1B can implement the functions described above.

3.5 State Tracking and Verification

Some applications can benefit from mechanisms for retrieving current state information for the purpose of tracking and verifying states of a TCP state machine, or for retrieving certain data values that the TCP modules use internally. Such verification also provides a way to determine whether communication across the peer-to-peer signaling layer is reliable—that is, to determine whether the standby TCP module is receiving correct data from the active TCP module.

In one embodiment, TCP high availability process 106A provides mechanisms for applications seeking real-time state verification. For example, in one embodiment, state replication logic 120 includes instructions for periodically checking that the states at the active TCP module and standby TCP module are identical. As one example, the values of TCP state variables such as sndwnd, snduna, rcvnxt, rcvwnd are compared, and an error is thrown if the values are not identical. Alternatively, an auto-recovery process can be initiated; thus, detecting that endpoints of a connection are out of synchronization can trigger recovery. Further, timer values may be compared within a tolerable skew amount. Application-specific values also may be checked.

In one embodiment, the interval during which such checks are performed is programmable. For example, an interval configuration value may specify that the foregoing state verification checks are performed after a specified number of packets, where the specified number of packets is chosen by the application. In one embodiment, verification checking is not enabled by default, but an application can enable verification checking on a per connection basis. This approach provides logic useful for debugging and fault recovery.

In still another embodiment, TCP high availability process 106A provides an API with a function that enables an application, such as BGP, to determine the sizes of any dummy packets that are in the send queue of the standby TCP module. With this information, the BGP application can generate packets of the same size and provide them to TCP for transmission. The standby TCP module then recreates the send queue using the provided packets. This approach ensures that if a receiving peer has any logical holes in its receive window, the window can be filled without problems.

3.6 Post-Switchover Processing

"Switchover" refers to a transfer of primary TCP segment processing control from the active TCP module to the standby TCP module. In one embodiment, after a switchover, to ensure ordered processing of TCP segments, the new active TCP module processes all pending events before actually becoming active and able to accept new segments. Pending events may include, for example, pending input packets that were received at the former active TCP module, but not replicated and sent to the former standby TCP module, at the time that the switchover occurred.

Further, in an embodiment, timers that are conventionally maintained in TCP implementations, such as the retransmission timer, give up timer, delayed ACK timer, etc., are reset to default values. This approach is based on the insight that corresponding timers at the active TCP module and the standby TCP module may inevitably lose synchronization due to differences in the accuracy of the clocks of the different CPUs that host the modules, but that TCP peers will adapt to changes if such values are reset. The only impact of restoring the default values is to extend the occurrence of some event by milliseconds, while not affecting long term average processing time.

In another embodiment, values for certain TCP options are cleared. For example, the SACK feature maintains state such as SACK blocks. However, because such features are optimization options for TCP, the information can be cleared at switchover without serious consequences. For example, the result of clearing SACK blocks is to cause the new active TCP module to drop SACK blocks for the few packets that were being processed; thereafter, SACK processing restarts for new packets. This approach also ensures that the standby TCP module can properly interface with the BGP peer when the peers have different software versions or operating system versions.

The foregoing features allow for active TCP module to eliminate a significant amount of checkpointing, without detectable harm over a period of more than a few packets.

3.7 Benefits of Certain Embodiments

Through these approaches, an embodiment uses intelligent techniques at the TCP level to achieve transparent failover of TCP connections. These approaches provide a foundation for supporting TCP applications, such as BGP, with high availability. The approaches avoid brute force checkpointing, and use intelligent techniques that are applied at the TCP level. The peer-to-peer signaling layer provides faster communication of replicated state data, and enables an implementation to re-use the IP header and the datalink layer header of a packet. As a result, efficient packet cloning is provided. In contrast, other approaches employ excessive checkpointing for both send and receive state machine values, these approaches are difficult to scale, and they require sophisticated hardware assistance.

4.0 Implementation Mechanisms—Hardware Overview

Figure 6:
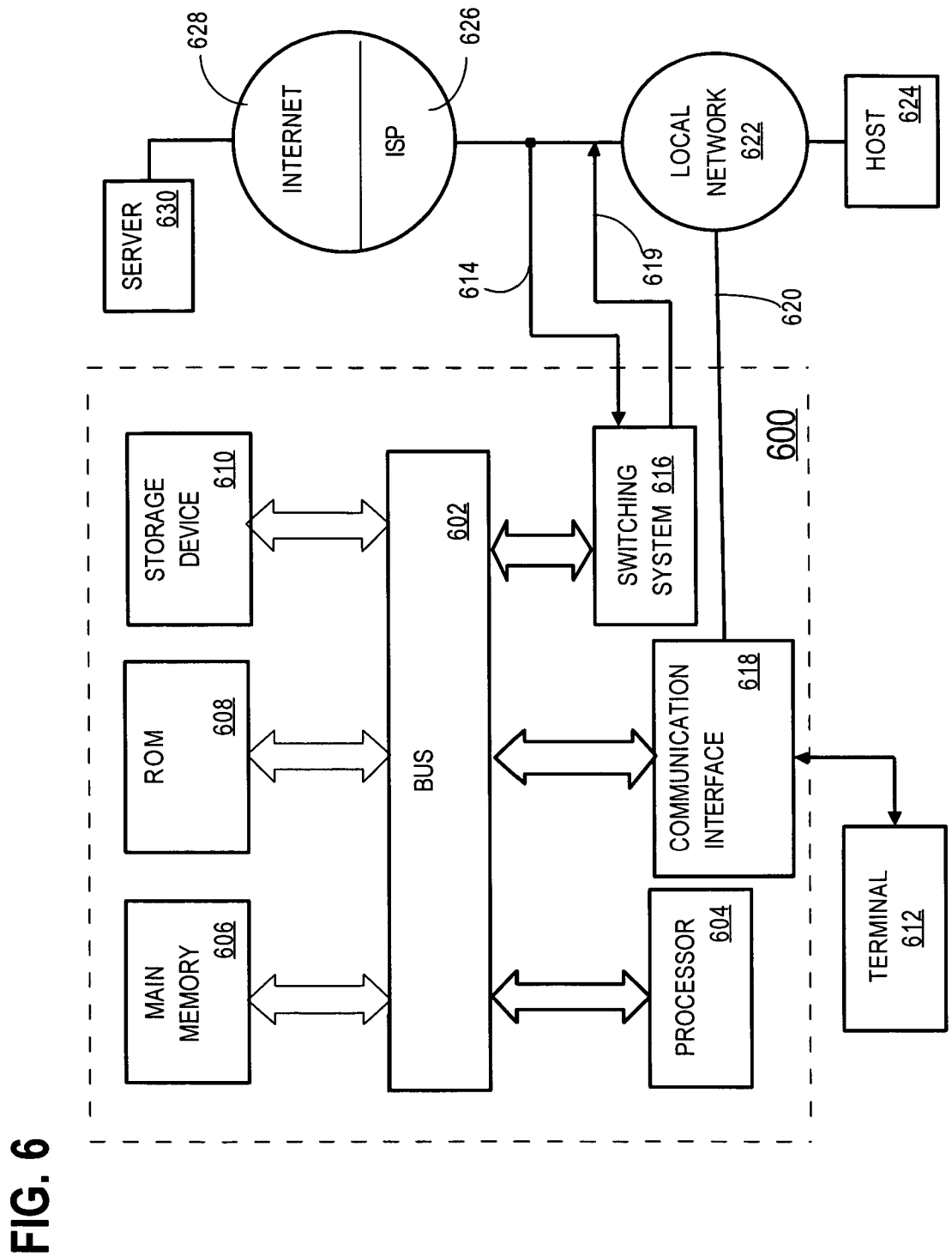
FIG. 6 is a block diagram that illustrates a computer system upon which an embodiment may be implemented.

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for upgrading network protocol software. According to one embodiment of the invention, upgrading network protocol software is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for upgrading network protocol software as described herein.

Processor 604 may execute the received code as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   receiving, at a network element comprising an active transport protocol process coupled to a standby transport protocol process, a request to configure a first transport layer connection maintained at the active transport protocol process for stateful switchover;
   wherein the active transport protocol process and the standby transport protocol process implement transmission control protocol (TCP);
   receiving a first event associated with the first transport layer connection wherein the first event comprises a TCP SYN segment;
   only in response to determining that a request to configure the first transport layer connection for stateful switchover was received:
      performing, at the active transport protocol process, one or more security checks on the TCP SYN segment;
      establishing completely at the active transport protocol process the first connection without informing the standby transport protocol process, as a result of receiving the first event;
      creating a first message containing a copy of a TCP control block, as a result of receiving the first event;
      sending, to the standby transport protocol process at the active transport protocol process, the first message only if the TCP SYN segment passes the one or more security checks;
      creating at the standby transport protocol process a second connection that replicates the first transport layer connection and uses the TCP control block copy, as a result of receiving the first message;
   receiving a second event associated with the first transport layer connection;
   only in response to determining that a request to configure the first transport layer connection for stateful switchover was received:
      creating a second message containing replicated event information based on the second received event, wherein the second message includes a valid header, correct length, and dummy data;
      sending the second message to the standby transport protocol process; and
      processing the second message at the standby transport protocol process, wherein the standby transport protocol process replicates state information for the first connection;

receiving a third event associated with a third transport layer connection maintained at the active transport protocol process; and in response to determining that a request to configure the third transport layer connection for stateful switchover was not received, processing the third event without sending any message to the standby transport protocol process.

2. A method as recited in claim 1, wherein the second message is sent from the active transport protocol process to the standby transport protocol process using a peer signaling layer, wherein the second message is not communicated to one or more logically lower protocol layers.

3. A method as recited in claim 1, wherein the first transport layer connection is configured not to perform send window checkpointing, wherein the active transport protocol process creates and sends, to the standby transport protocol process, a TCP segment with a valid header, correct length, and dummy data.

4. A method as recited in claim 1, wherein the active transport protocol process and the standby transport protocol process implement TCP, and wherein the network element hosts active and standby Border Gateway Protocol (BGP) processes logically on top of the respective TCP processes.

5. A method as recited in claim 1, further comprising receiving a request for state verification, testing whether one or more state values maintained by the active transport protocol process for the first transport layer connection match one or more corresponding state values that are maintained by the standby transport protocol process for a replica of the first transport layer connection, and performing a responsive action when no match occurs.

6. A method as recited in claim 1 wherein, in response to a switchover, the standby transport protocol process, processes all pending events associated with all active connections, resets all timer values associated with the connections, and resets all option values associated with the connections before becoming active.

7. A network routing apparatus, comprising:

an active route processor that runs an active transport protocol process;

a standby route processor that is coupled to the active route processor in a redundant arrangement, and that runs a standby transport protocol process;

a computer-readable storage device that is accessible to the active route processor and the standby route processor, and storing one or more sequences of instructions which, when executed by the route processors, cause the route processors to perform the steps of:

receiving a request to configure a first transport layer connection maintained at the active transport protocol process for stateful switchover, wherein the active transport protocol process and the standby transport protocol process implement transmission control protocol (TCP);

receiving a first event associated with the first transport layer connection wherein the first event comprises a TCP SYN segment;

only in response to determining that a request to configure the first transport layer connection for stateful switchover was received performing, at the active transport protocol process, one or more security checks on the TCP SYN segment;

establishing completely at the active transport protocol process the first connection without informing the standby transport protocol process, as a result of receiving the first event;

creating a first message containing a copy of a TCP control block, as a result of receiving the first event;

sending, to the standby transport protocol process at the active transport protocol process, the first message only if the TCP SYN segment passes the one or more security checks;

creating at the standby transport protocol process a second connection that replicates the first transport layer connection and uses the TCP control block copy, as a result of receiving the first message;

receiving a second event associated with the first transport layer connection;

only in response to determining that a request to configure the first transport layer connection for stateful switchover was received:

creating a second message containing replicated event information based on the second received event, wherein the second message includes a valid header, correct length, and dummy data;

sending the second message to the standby transport protocol process; and processing the second message at the standby transport protocol process, wherein the standby transport protocol process replicates state information for the first connection;

receiving a third event associated with a third transport layer connection maintained at the active transport protocol process; and in response to determining that a request to configure the third transport layer connection for stateful switchover was not received, processing the third event without sending any message to the standby transport protocol process.

8. An apparatus as recited in claim 7, wherein the second message is sent from the active transport protocol process to the standby transport protocol process using a peer signaling layer, wherein the second message is not communicated to one or more logically lower protocol layers.

9. An apparatus as recited in claim 7, wherein the first transport layer connection is configured not to perform send window checkpointing, wherein the active transport protocol process creates and sends, to the standby transport protocol process, a TCP segment with a valid header, correct length, and dummy data.

10. An apparatus as recited in claim 7, wherein the active transport protocol process and the standby transport protocol process implement TCP, and wherein the network element hosts active and standby Border Gateway Protocol (BGP) processes logically on top of the respective TCP processes.

11. An apparatus as recited in claim 7, further comprising receiving a request for state verification, testing whether one or more state values maintained by the active transport protocol process for the first transport layer connection match one or more corresponding state values that are maintained by the standby transport protocol process for a replica of the first transport layer connection, and performing a responsive action when no match occurs.

12. An apparatus as recited in claim 7, wherein in response to a switchover, the standby transport protocol process, processes all pending events associated with all active connections, resets all timer values associated with the connections, and resets all option values associated with the connections before becoming active.

13. A network routing apparatus, comprising:

an active route processor that runs an active transport protocol process;

a standby route processor that is coupled to the active route processor in a redundant arrangement, and that runs a standby transport protocol process;

means for receiving a request to configure a first transport layer connection maintained at the active transport protocol process for stateful switchover;

wherein the active transport protocol process and the standby transport protocol process implement transmission control protocol (TCP);

means for receiving a first event associated with the first transport layer connection wherein the first event comprises a TCP SYN segment;

means for performing, at the active transport protocol process, one or more security checks on the TCP SYN segment only if a request to configure the first transport layer connection for stateful switchover was received;

means for establishing completely at the active transport protocol process the first connection without informing the standby transport protocol process, as a result of receiving the first event, only if a request to configure the first transport layer connection for stateful switchover was received;

means for creating a first message containing a copy of a TCP control block, as a result of receiving the first event, only if a request to configure the first transport layer connection for stateful switchover was received;

means for sending, to the standby transport protocol process at the active transport protocol process, the first message only if the TCP SYN segment passes the one or more security checks, and only if a request to configure the first transport layer connection for stateful switchover was received;

means for creating at the standby transport protocol process a second connection that replicates the first transport layer connection and uses the TCP control block copy, as a result of receiving the first message, only if a request to configure the first transport layer connection for stateful switchover was received;

means for receiving a second event associated with the first transport layer connection;

means for creating a second message containing replicated event information based on the second received event, wherein the second message includes a valid header, correct length, and dummy data, only if a request to configure the first transport layer connection for stateful switchover was received;

means for sending the second message to the standby transport protocol process only if a request to configure the first transport layer connection for stateful switchover was received; and means for processing the second message at the standby transport protocol process, wherein the standby transport protocol process replicates state information for the first connection, only if a request to configure the first transport layer connection for stateful switchover was received;

means for receiving a third event associated with a third transport layer connection maintained at the active transport protocol process; and means for processing the third event without sending any message to the standby transport protocol process if a request to configure the third transport layer connection for stateful switchover was not received.

14. An apparatus as recited in claim 13, wherein the second message is sent from the active transport protocol process to the standby transport protocol process using a peer signaling layer, wherein the second message is not communicated to one or more logically lower protocol layers.

15. An apparatus as recited in claim 13, wherein the first transport layer connection is configured not to perform send window checkpointing, wherein the active transport protocol process includes means for creating and sending, to the standby transport protocol process, a TCP segment with a valid header, correct length, and dummy data.

16. An apparatus as recited in claim 13, wherein the active transport protocol process and the standby transport protocol process implement TCP, and wherein the network element includes means for hosting active and standby Border Gateway Protocol (BGP) processes logically on top of the respective TCP processes.

17. An apparatus as recited in claim 13, further comprising means for receiving a request for state verification, means for testing whether one or more state values maintained by the active transport protocol process for the first transport layer connection match one or more corresponding state values that are maintained by the standby transport protocol process for a replica of the first transport layer connection, and means for performing a responsive action when no match occurs.

18. An apparatus as recited in claim 13, wherein:

the standby route processor includes means for processing all pending events associated with all active connections, means for resetting all timer values associated with the connections, and means for resetting all option values associated with the connections before becoming active; and the means for processing all pending events, the means for resetting all timer values, and the means for resetting all option values are responsive to a switchover.

19. A computer-readable storage device storing one or more sequences of instructions, which instructions, when executed by one or more processors, cause the one or more processors to carry out the steps of:

receiving, at a network element comprising an active transport protocol process coupled to a standby transport protocol process, a request to configure a first transport layer connection maintained at the active transport protocol process for stateful switchover;

wherein the active transport protocol process and the standby transport protocol process implement transmission control protocol (TCP);

receiving a first event associated with the first transport layer connection wherein the first event comprises a TCP SYN segment;

only in response to determining that a request to configure the first transport layer connection for stateful switchover was received:

performing, at the active transport protocol process, one or more security checks on the TCP SYN segment;

establishing completely at the active transport protocol process the first connection without informing the standby transport protocol process, as a result of receiving the first event;

creating a first message containing a copy of a TCP control block, as a result of receiving the first event;

sending, to the standby transport protocol process at the active transport protocol process, the first message only if the TCP SYN segment passes the one or more security checks;

creating at the standby transport protocol process a second connection that replicates the first transport layer connection and uses the TCP control block copy, as a result of receiving the first message;

receiving a second event associated with the first transport layer connection;

only in response to determining that a request to configure the first transport layer connection for stateful switchover was received:
- creating a second message containing replicated event information based on the second received event, wherein the second message includes a valid header, correct length, and dummy data;
- sending the second message to the standby transport protocol process; and processing the second message at the standby transport protocol process, wherein the standby transport protocol process replicates state information for the first connection;

receiving a third event associated with a third transport layer connection maintained at the active transport protocol process; and in response to determining that a request to configure the third transport layer connection for stateful switchover was not received, processing the third event without sending any message to the standby transport protocol process.

\* \* \* \* \*

UNITED STATES PATENT AND TRADEMARK OFFICE
CERTIFICATE OF CORRECTION

PATENT NO. : 7,751,311 B2  Page 1 of 1
APPLICATION NO. : 11/134678
DATED : July 6, 2010
INVENTOR(S) : Anantha Ramaiah et al.

It is certified that error appears in the above-identified patent and that said Letters Patent is hereby corrected as shown below:

Column 14
Claim 1: Line 40: After "first" and before "connection" insert --transport layer--.

Line 66: After "first" insert --transport layer--.

Column 15
Claim 6: Line 37: After "the" and before "connections" insert --active--.

Claim 7: Line 65: After "first" and before "connection" insert --transport layer--.

Column 16
Claim 7: Line 24: After "first" insert --transport layer--.

Claim 12: Line 62: After "the" and before "connections" insert --active--.
Line 63: After "the" and before "connections" insert --active--.

Column 17
Claim 13: Line 18: After "first" and before "connection" insert --transport layer--.
Lines 21-23: After "first event" delete ", only if a request to configure the first transport layer connection for stateful switchover was received".

Line 55: After "first" and before "connection" insert --transport layer--.

Column 18
Claim 18: Line 29: After "the" and before "connections" insert --active--.
Line 30: After "the" and before "connections" insert --active--.

Claim 19: Line 59: After "first" and before "connection" insert --transport layer--.

Column 20
Claim 19: Line 3: After "first" insert --transport layer--.

Signed and Sealed this

Twelfth Day of October, 2010

David J. Kappos
*Director of the United States Patent and Trademark Office*